United States Patent
Tsuiki (10) Patent No.: US 8,833,147 B2
(45) Date of Patent: Sep. 16, 2014

(54) DIAGNOSTIC APPARATUS FOR FUEL INJECTOR

(75) Inventor: Toyomori Tsuiki, Kariya (JP)

(73) Assignee: Denso Corporation, Kariya (JP)

( * ) Notice: Subject to any disclaimer, the term of this patent is extended or adjusted under 35 U.S.C. 154(b) by 311 days.

(21) Appl. No.: 13/418,754

(22) Filed: Mar. 13, 2012

(65) Prior Publication Data

US 2012/0234295 A1 Sep. 20, 2012

(30) Foreign Application Priority Data

Mar. 14, 2011 (JP) .................................. 2011-55196

(51) Int. Cl.
  *G01M 15/00* (2006.01)
  *F02M 57/00* (2006.01)
  *F02D 41/22* (2006.01)

(52) U.S. Cl.
  CPC .............. *F02D 41/221* (2013.01); *Y02T 10/40* (2013.01); *F02D 2041/224* (2013.01); *F02D 2200/0602* (2013.01); *F02M 57/005* (2013.01)
  USPC ...................... 73/114.43; 73/114.45; 701/102; 123/299; 123/300; 123/506; 123/514; 123/446; 123/447; 123/497; 123/458

(58) Field of Classification Search
  CPC ....... F02M 63/00; F02M 61/16; F02M 65/00; F02D 41/22; F02D 45/00
  USPC ............. 73/114.43, 114.45, 114.51; 123/299, 123/300, 479
  See application file for complete search history.

(56) References Cited

U.S. PATENT DOCUMENTS

| 7,210,459 B2 * | 5/2007 | Shibata ......................... 123/456 |
| 7,933,712 B2 * | 4/2011 | Ishizuka et al. ............... 701/114 |
| 2008/0228374 A1 | 9/2008 | Ishizuka et al. |
| 2009/0056677 A1 * | 3/2009 | Nakata et al. ................. 123/480 |
| 2009/0088951 A1 | 4/2009 | Ishizuka et al. |
| 2009/0250038 A1 * | 10/2009 | Xu et al. ....................... 123/457 |

FOREIGN PATENT DOCUMENTS

JP 2010-216383 9/2010

OTHER PUBLICATIONS

Office Action (2 pages) dated Feb. 5, 2013, issued in corresponding Japanese Application No. 2011-055196 and English translation (3 pages).
Office Action (6 pages) dated Apr. 3, 2014, issued in corresponding Chinese Application No. 2012-10067452.2 and English translation (6 pages).

* cited by examiner

*Primary Examiner* — Thomas Moulis
*Assistant Examiner* — Joseph Dallo
(74) *Attorney, Agent, or Firm* — Nixon & Vanderhye PC (57) ABSTRACT

Based on a detection signal of a fuel pressure sensor provided in a first fuel injector, an ECU determines whether a fuel pressure in a first fuel injector is increased over a specified amount when a second fuel injector provided with no fuel pressure sensor terminates a fuel injection. When the ECU determines that the fuel pressure in the first fuel injector is increased over a specified amount, it is diagnosed that the second fuel injector does not have a malfunction of continuous injection.

5 Claims, 8 Drawing Sheets

INJECTION-CYLINDER
WAVEFORM "Wa"

FIG. 3B

NON-INJECTION-CYLINDER
WAVEFORM "Wu"

FIG. 3C

INJECTION WAVEFORM "Wb"
(Wb=Wa-Wu)

DIAGNOSTIC APPARATUS FOR FUEL INJECTOR

CROSS-REFERENCE TO RELATED APPLICATION

This application is based on Japanese Patent Application No. 2011-55196 filed on Mar. 14, 2011, the disclosure of which is incorporated herein by reference.

TECHNICAL FIELD

The present disclosure relates to a diagnostic apparatus for a fuel injector. The fuel injector is provided to a fuel injection system in which a fuel pressure sensor is disposed in a fuel passage extending from an outlet of an accumulator to an injection port of the fuel injector.

BACKGROUND

JP-2009-85164A (US-2009-0088951A1) shows a fuel injection system which is provided with a fuel pressure sensor detecting a fuel pressure in a fuel passage between a common-rail (accumulator) and an injection port of a fuel injector. Based on a detection value of the fuel pressure sensor, a fuel pressure waveform indicative of a variation in fuel pressure due to a fuel injection is detected. If the detected fuel pressure waveform is significantly different from a supposed waveform, it is determined that a fuel injector has a malfunction in which a valve body is stuck at its opening position so that the fuel is continuously injected through the fuel injector.

However, in a case that the above system is applied to a multi-cylinder engine, it is necessary that the fuel pressure sensor is provided to each of fuel injectors, which may increase its costs.

SUMMARY

It is an object of the present disclosure to provide a diagnostic apparatus for a fuel injector, which is able to diagnose a fuel injector in which no fuel pressure sensor is provided, so that the number of the fuel pressure sensor can be reduced.

According to the present disclosure, a fuel injector is mounted to a fuel injection system which includes a first fuel injector mounted to a first cylinder of an internal combustion engine, a second fuel injector mounted to a second cylinder of the engine, and an accumulator accumulating a fuel for distributing a high-pressure fuel into the first fuel injector and the second fuel injector. In the fuel injection system, a first fuel passage extends from an outlet of the accumulator to an injection port of the first fuel injector, a first fuel pressure sensor is disposed in the first fuel pressure passage for detecting a fuel pressure in the first fuel passage, and a second fuel passage extends from an outlet of the accumulator to an injection port of the second fuel injector. No fuel pressure sensor is disposed in the second fuel passage.

A diagnostic apparatus comprising: a pressure-return determining portion for determining, based on a detection value of the first fuel pressure sensor, whether a specified pressure increase occurs in the first fuel passage when the second fuel injector terminates a fuel injection; and a diagnosis portion for determining that the second fuel injector has no malfunction of continuous injection when the pressure-return determining portion determines that the specified pressure increase occurs in the first fuel passage.

When the second fuel injector normally terminates a fuel injection, a fuel pressure in the second fuel passage is increased. Then, this fuel-pressure-increase generated in the second fuel passage is propagated to the first fuel passage through the accumulator. After the fuel pressure in the second fuel passage is increased, the fuel pressure in the first fuel passage is also increased. Therefore, in a case that the second fuel injector is normally operated, the fuel pressure in the first fuel passage, which is detected by the first fuel pressure sensor, should be increased over a specified amount at a time when a specified time period has elapsed after the second fuel injector terminates the fuel injection. Meanwhile, if the second fuel injector has a malfunction of continuous injection in which the second fuel injector can not terminate the fuel injection, the above fuel-pressure-increase does not occur in the first fuel passage.

In view of the above, according to the present disclosure, based on a detection value of the first fuel pressure sensor disposed in the first fuel passage, it is determined whether a fuel-pressure-increase occurs in the first fuel passage when the second fuel injector terminates a fuel injection. When it is determined that the fuel-pressure-increase occurs in the first fuel passage, it is determined that the second fuel injector does not have a malfunction of continuous injection. Therefore, without providing a fuel pressure sensor in the second fuel passage, it can be diagnosed whether the second fuel injector has a malfunction of continuous injection by using of the first fuel pressure sensor disposed in the first fuel passage.

BRIEF DESCRIPTION OF THE DRAWINGS

The above and other objects, features and advantages of the present disclosure will become more apparent from the following detailed description made with reference to the accompanying drawings. In the drawings:

FIG. 5 is a chart showing a fuel pressure variation in a high-pressure passage in a case that no malfunction occurs in all fuel injectors, a common-rail, a high-pressure pipe and the like;

DETAILED DESCRIPTION

Hereafter, an embodiment of the present invention is described. A diagnostic apparatus for a fuel injector is applied to an internal combustion engine (diesel engine) having four cylinders #1-#4.

Figure 1:
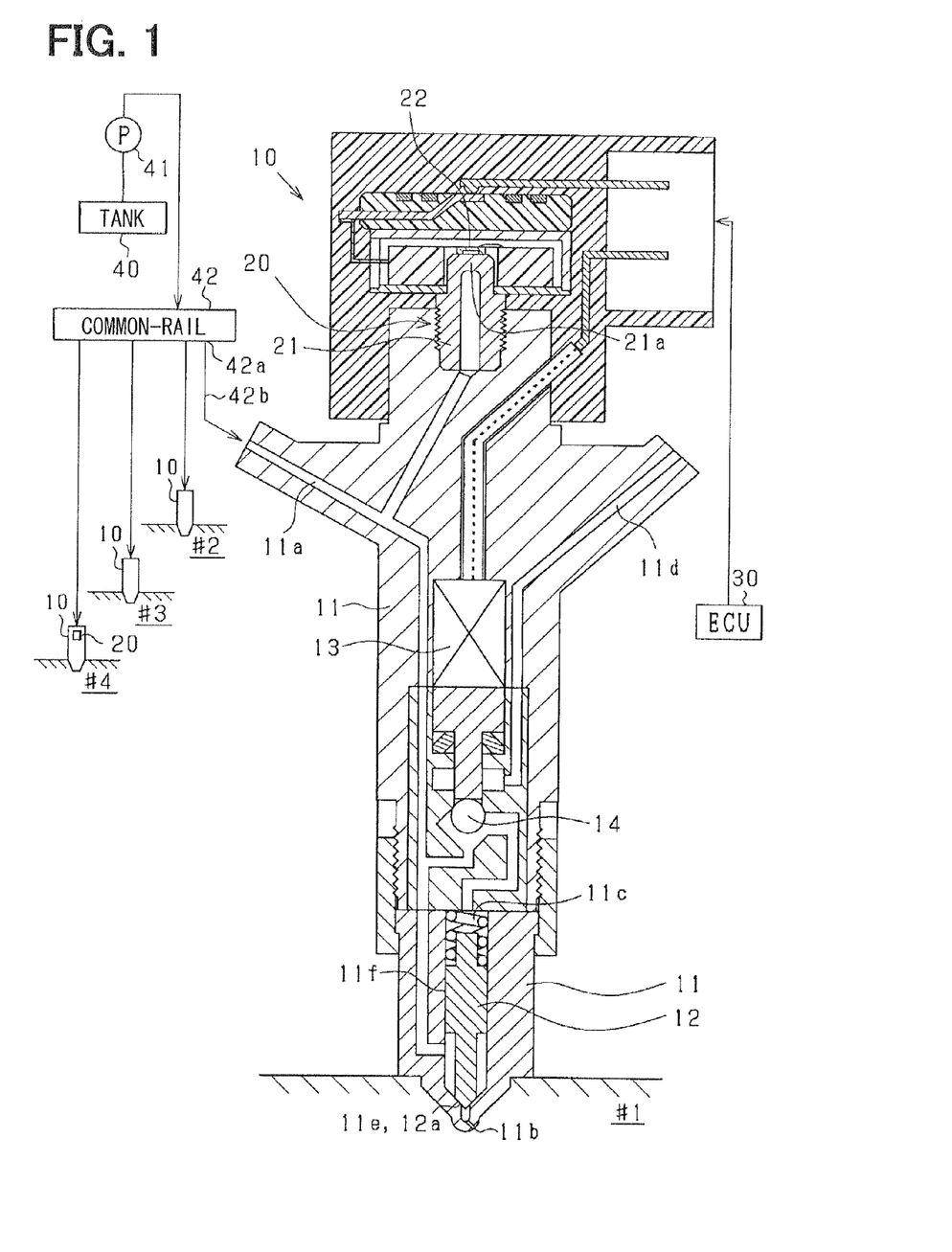
FIG. 1 is a construction diagram showing an outline of a fuel injection system on which a diagnostic apparatus for a fuel injector is mounted, according to an embodiment of the present invention.

FIG. 1 is a schematic view showing fuel injectors 10 provided to each cylinder, a fuel pressure sensor 20 provided to each fuel injector 10, an electronic control unit (ECU) 30 and the like.

First, a fuel injection system of the engine including the fuel injector 10 will be explained. A fuel in a fuel tank 40 is pumped up by a high-pressure pump 41 and is accumulated in a common-rail (accumulator) 42 to be supplied to each fuel injector 10 (#1-#4). Each of the fuel injectors 10 (#1-#4) performs a fuel injection sequentially in a predetermined order. In the present embodiment, #1 fuel injector, #3 fuel injector, #4 fuel injector, and #2 fuel injector perform fuel injections in this order.

The high-pressure fuel pump 41 is a plunger pump which intermittently discharges high-pressure fuel. Since the fuel pump 41 is driven by the engine through the crankshaft, the fuel pump 41 discharges the fuel predetermined times while the fuel injectors 10 inject the fuel in the above order.

The fuel injector 10 is comprised of a body 11, a needle valve body 12, an actuator 13 and the like. The body 11 defines a high-pressure passage 11a and an injection port 11b. The needle valve body 12 is accommodated in the body 11 to open/close the injection port 11b.

The body 11 defines a backpressure chamber 11c with which the high-pressure passage 11a and a low-pressure passage 11d communicate. A control valve 14 switches between the high-pressure passage 11a and the low-pressure passage 11d, so that the high-pressure passage 11a communicates with the backpressure chamber 11c or the low-pressure passage 11d communicates with the backpressure chamber 11c. When the actuator 13 is energized and the control valve 14 moves downward in FIG. 1, the backpressure chamber 11c communicates with the low-pressure passage 11d, so that the fuel pressure in the backpressure chamber 11c is decreased. Consequently, the back pressure applied to the valve body 12 is decreased so that the valve body 12 is lifted up (valve-open). A top surface 12a of the valve body 12 is unseated from a seat surface 11e, whereby the fuel is injected through the injection port 11b.

Meanwhile, when the actuator 13 is deenergized and the control valve 14 moves upward, the backpressure chamber 11c communicates with the high-pressure passage 11a, so that the fuel pressure in the backpressure chamber 11c is increased. Consequently, the back pressure applied to the valve body 12 is increased so that the valve body 12 is lifted down (valve-close). The top surface 12a of the valve body 12 is seated on the seat surface 11e, whereby the fuel injection is terminated.

The ECU 30 controls the actuator 13 to drive the valve body 12. When the needle valve body 12 opens the injection port 11b, high-pressure fuel in the high-pressure passage 11a is injected to a combustion chamber (not shown) of the engine through the injection port 11b.

Although all of the fuel injectors 10 are not provided with the fuel pressure sensor 20, at least two of the fuel injectors 10 are provided with the fuel pressure sensor 20. That is, the number of the fuel pressure sensors 20 is less than the number of the fuel injectors 10 and is not less than "2". In the present embodiment, #1 fuel injector 10 and #4 fuel injector 10 are provided with the fuel pressure sensor 20, and #3 fuel injector 10 and #2 fuel injector 10 are provided with no fuel pressure sensor.

It should be noted that #1 fuel injector 10 mounted to #1 cylinder corresponds to a first fuel injector, #3 fuel injector 10 mounted to #3 cylinder corresponds to a second fuel injector, and #4 fuel injector 10 mounted to #4 cylinder corresponds to a third fuel injector. A high-pressure pipe 42b connects the outlet 42a of the common-rail 42 and #1 fuel injector 10. A high-pressure passage 11a is defined in the body 11 of the #1 fuel injector 10. A fuel passage defined in the high-pressure pipe 42b and the high-pressure passage 11a correspond to a first fuel passage. Further, a high-pressure pipe connecting #3 fuel injector 10 and the common-rail 42 and a high-pressure passage defined in #3 fuel injector 10 correspond to a second fuel passage. A high-pressure pipe connecting #4 fuel injector 10 and the common-rail 42 and a high-pressure passage defined in #4 fuel injector 10 correspond to a third fuel passage. Furthermore, #1 fuel pressure sensor 20 mounted to #1 fuel injector 10 corresponds to a first fuel pressure sensor, and #4 fuel pressure sensor 20 mounted to #4 fuel injector 10 corresponds to a third fuel pressure sensor.

The fuel pressure sensor 20 includes a stem 21 (load cell) and a pressure sensor element 22. The stem 21 is provided to the body 11. The stem 21 has a diaphragm 21a which elastically deforms in response to high fuel pressure in the high-pressure passage 11a. The pressure sensor element 22 is disposed on the diaphragm 21a to transmit a pressure detection signal depending on an elastic deformation of the diaphragm 21a toward the ECU 30.

Figure 2A:
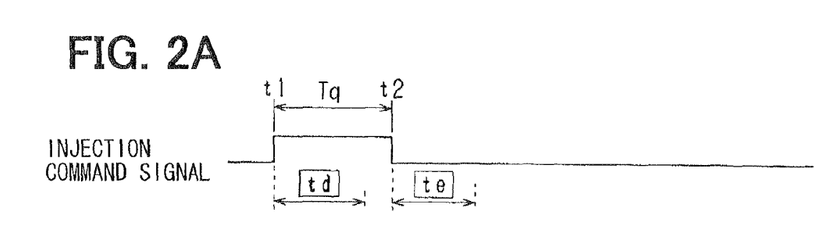
FIGS. 2A, 2B, and 2C are graphs showing variations in a fuel injection rate and a fuel pressure relative to a fuel injection command signal.

The ECU 30 has a microcomputer which computes a target fuel injection condition, such as the number of fuel injections, a fuel-injection-start time, a fuel-injection-end time, and a fuel injection quantity. For example, the microcomputer stores an optimum fuel-injection condition with respect to the engine load and the engine speed in a fuel-injection condition map. Then, based on the current engine load and the engine speed, the target fuel-injection condition is computed in view of the fuel-injection condition map. The fuel-injection-command signals t1, t2, Tq (refer to FIG. 2A) corresponding to the computed target injection condition are established based on the injection-rate parameters "td", "te", R$\alpha$, R$\beta$, Rmax, which will be described later in detail. These fuel-injection-command signals are transmitted to the fuel injector 10.

Referring to FIGS. 2A to 3C, with respect to #1 fuel injector 10 and #4 fuel injector 10 which respectively have the fuel pressure sensor 20, a processing of fuel injection control will be described hereinafter.

For example, in a case that #1 fuel injector 10 mounted to #1 cylinder injects the fuel, a variation in fuel pressure due to a fuel injection is detected as a fuel pressure waveform (refer to FIG. 2C) based on detection values of #1 fuel pressure sensor 20. Based on the detected fuel pressure waveform, a fuel injection-rate waveform (refer to FIG. 2B) representing a variation in fuel injection quantity per a unit time is computed. Then, the injection-rate parameters R$\alpha$, R$\beta$, Rmax which identify the injection-rate waveform are learned, and the injection-rate parameters "te", "td" which identify the correlation between the injection-command signals (pulse-on time point t1, pulse-off time point t2 and pulse-on period Tq) and the injection condition are learned.

Specifically, a descending pressure waveform from a point P1 to a point P2 is approximated to a descending straight line L$\alpha$ by least square method. At the point P1, the fuel pressure starts to descend due to a fuel injection. At the point P2, the fuel pressure stops to descend. Then, a time point LB$\alpha$ at which the fuel pressure becomes a reference value B$\alpha$ on the approximated descending straight line L$\alpha$ is computed. Since the time point LB$\alpha$ and the fuel-injection-start time R1 have a correlation with each other, the fuel-injection-start time R1 is computed based on the time point LB$\alpha$. Specifically, a time point prior to the time point LB$\alpha$ by a specified time delay C$\alpha$ is defined as the fuel-injection-start time R1.

Further, an ascending pressure waveform from a point P3 to a point P5 is approximated to an ascending straight line L$\beta$ by least square method. At the point P3, the fuel pressure starts to ascend due to a termination of a fuel injection. At the point P5, the fuel pressure stops to ascend. Then, a time point LBβ at which the fuel pressure becomes a reference value Bβ on the approximated ascending straight line Lβ is computed. Since the time point LBβ and the fuel-injection-end time R4 have a correlation with each other, the fuel-injection-end time R4 is computed based on the time point LBβ. Specifically, a time point prior to the time point LBβ by a specified time delay Cβ is defined as the fuel-injection-end time R4.

Figure 2B:
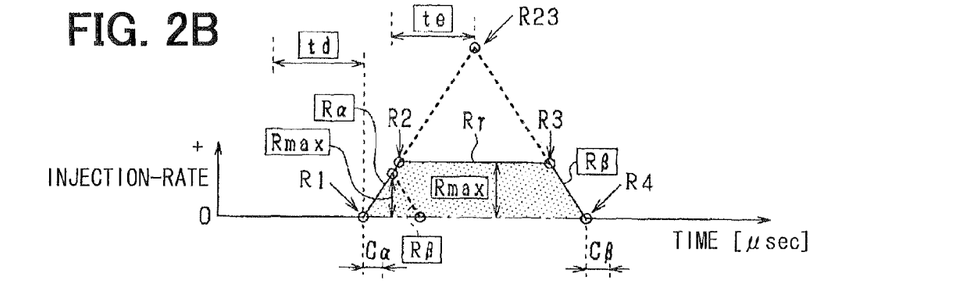
Figure 2C:
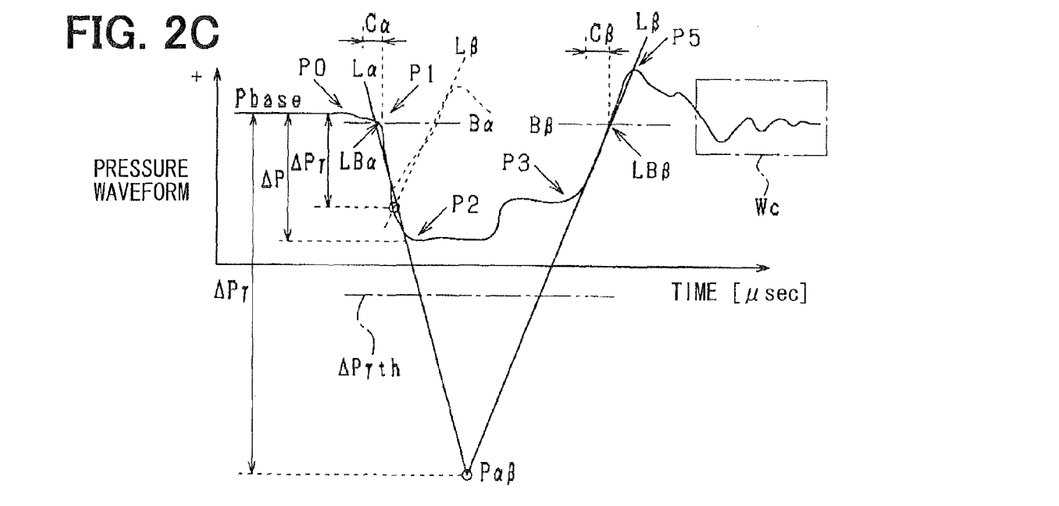
Figure 3A:
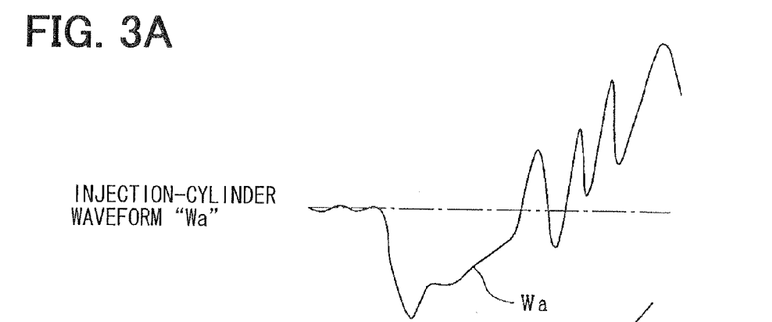
FIGS. 3A, 3B and 3C are charts which respectively show an injection-cylinder pressure waveform Wa, a non-injection-cylinder pressure waveform Wu, and an injection pressure waveform Wb.
Figure 3B:
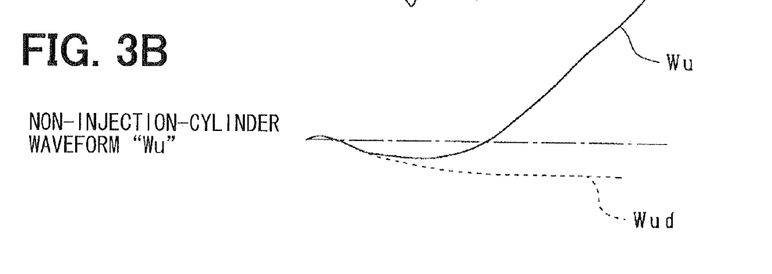
Figure 3C:
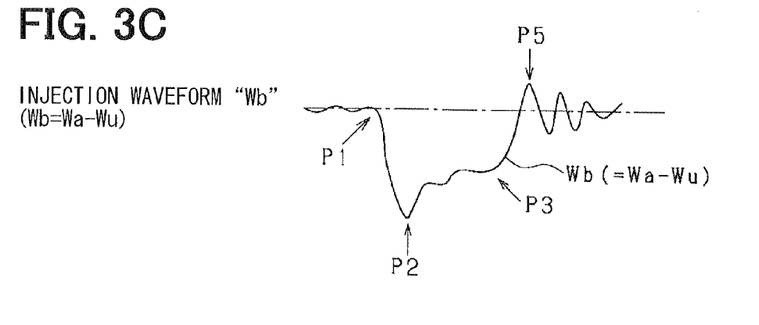

In view of a fact that an inclination of the descending straight line Lα and an inclination of the injection-rate increase have a high correlation with each other, an inclination of a straight line Rα, which represents an increase in fuel injection-rate in FIG. 2B, is computed based on an inclination of the descending straight line Lα. Specifically, an inclination of the straight line Lα is multiplied by a specified coefficient to obtain the inclination of the straight line Rα. Similarly, in view of a fact that an inclination of the ascending straight line Lβ and an inclination of the injection-rate decrease have a high correlation with each other, an inclination of a straight line Rβ, which represents a decrease in fuel injection-rate, is computed based on an inclination of the ascending straight line Lβ.

Then, based on the straight lines Rα, Rβ, a valve-close start time R23 is computed. At this time R23, the valve body 12 starts to be lifted down along with a fuel-injection-end command signal. Specifically, an intersection of the straight lines Rα and Rβ is defined as the valve-close start time R23. Further, a fuel-injection-start time delay "td" of the fuel-injection-start time R1 relative to the pulse-on time point t1 is computed. Also, a fuel-injection-end time delay "te" of the valve-close start time R23 relative to the pulse-off time point t2 is computed.

An intersection of the descending straight line Lα and the ascending straight line Lβ is obtained and a pressure corresponding to this intersection is computed as an intersection pressure Paβ. Further, a differential pressure ΔPγ between a reference pressure Pbase and the intersection pressure Paβ is computed. In view of the fact that the differential pressure ΔPγ and the maximum injection-rate Rmax have a high correlation with each other, the maximum injection-rate Rmax is computed based on the differential pressure ΔPγ.

Specifically, the differential pressure ΔPγ is multiplied by a correlation coefficient Cγ to compute the maximum injection-rate Rmax. In a case that the differential pressure ΔPγ is less than a specified value ΔPγth (small injection), the maximum fuel injection-rate Rmax is defined as follows:

$$Rmax = \Delta P\gamma \times C\gamma$$

In a case that the differential pressure ΔPγ is not less than the specified value ΔPγth (large injection), a predetermined value Rγ is defined as the maximum injection-rate Rmax. An average fuel pressure of the reference pressure waveform is computed as a reference pressure Pbase. The reference pressure waveform corresponds to a part of the fuel injection waveform of a period in which the fuel pressure has not started to be decreased due to a fuel injection.

The small injection corresponds to a case in which the valve 12 starts to be lifted down before the injection-rate reaches the predetermined value Rγ. The fuel injection quantity is restricted by the seat surfaces 11e and 12a. Meanwhile, the large-injection corresponds to a case in which the valve 12 starts to be lifted down after the injection-rate reaches the predetermined value Rγ. The fuel injection quantity depends on the flow area of the injection port 11b. Incidentally, when the injection command period "Tq" is long enough and the injection port 11b has been opened even after the maximum injection-rate is achieved, the shape of the injection-rate waveform becomes trapezoid, as shown in FIG. 2B. Meanwhile, in a case of the small-injection, the shape of the injection-rate waveform becomes triangle.

The above predetermined value Rγ, which corresponds to the maximum injection-rate Rmax in case of the large-injection, varies along with an aging deterioration of the fuel injector 10. For example, if particulate matters are accumulated in the injection port 11b and the fuel injection quantity decreases along with age, the pressure drop amount ΔP shown in FIG. 2C becomes smaller. Also, if the seat surfaces 11e, 12a are worn away and the fuel injection quantity is increased, the pressure drop amount ΔP becomes larger. It should be noted that the pressure drop amount ΔP corresponds to a detected pressure drop amount which is caused due to a fuel injection. For example, it corresponds to a pressure drop amount from the reference pressure Pbase to the point P2, or from the point P1 to the point P2.

In the present embodiment, in view of the fact that the maximum injection-rate Rmax (predetermined value Rγ) in a large-injection has high correlation with the pressure drop amount ΔP, the predetermined value Rγ is established based on the pressure drop amount ΔP. That is, the learning value of the maximum injection-rate Rmax in the large-injection corresponds to a learning value of the predetermined value Rγ based on the pressure drop amount ΔP.

As above, the injection-rate parameters "td", "te", Rα, Rβ, Rmax can be derived from the fuel pressure waveform. Then, based on the learning values of these parameters "td", "te", Rα, Rβ, Rmax, the injection-rate waveform (refer to FIG. 2B) corresponding to the fuel-injection-command signals (FIG. 2A) can be computed. An area of the computed injection-rate waveform (shaded area in FIG. 2B) corresponds to a fuel injection quantity. Thus, the fuel injection quantity can be computed based on the injection-rate parameters.

That is, the actual fuel injection condition (injection-rate parameters "td", "te", Rα, Rβ, Rmax) relative to the fuel-injection-command signals is detected and learned. Based on this learning value, the fuel-injection-command signals corresponding to the target injection condition are established. Therefore, the fuel-injection-command signals are feedback controlled based on the actual injection condition, whereby the actual fuel injection condition is accurately controlled in such a manner as to agree with the target injection condition even if the deterioration with age is advanced. Especially, the injection command period "Tq" is feedback controlled based on the injection-rate parameter so that the actual fuel injection quantity agrees with the target fuel injection quantity.

In the following description, a cylinder in which a fuel injection is currently performed is referred to as an injection cylinder and a cylinder in which no fuel injection is currently performed is referred to as a non-injection cylinder. Further, a fuel pressure sensor 20 provided in the injection cylinder 10 is referred to as an injection-cylinder pressure sensor and a fuel pressure sensor 20 provided in the non-injection cylinder 10 is referred to as a non-injection-cylinder pressure sensor.

The fuel pressure waveform Wa (refer to FIG. 3A) detected by the injection-cylinder pressure sensor 20 includes not only the waveform due to a fuel injection but also the waveform due to other matters described below. In a case that the fuel pump 41 intermittently supplies the fuel to the common-rail 42, the entire fuel pressure waveform Wa ascends when the fuel pump supplies the fuel while the fuel injector 10 injects the fuel. That is, the fuel pressure waveform Wa includes a fuel pressure waveform Wb (refer to FIG. 3C) representing a fuel pressure variation due to a fuel injection and a pressure waveform Wu (refer to FIG. 3B) representing a fuel-pressure-increase by the fuel pump 41.

Even in a case that the fuel pump 41 supplies no fuel while the fuel injector 10 injects the fuel, the fuel pressure in the fuel injection system decreases immediately after the fuel injector 10 injects the fuel. Thus, the entire fuel pressure waveform Wa descends. That is, the fuel pressure waveform Wa includes a waveform Wb representing a fuel pressure variation due to a fuel injection and a waveform Wud (refer to FIG. 3B) representing a fuel pressure decrease in the fuel injection system.

In view of a fact that the non-injection pressure waveform Wu (Wud) detected by the non-injection-cylinder pressure sensor 20 represents a fuel pressure variation in the common-rail 42, the non-injection pressure waveform Wu (Wud) is subtracted from the injection pressure waveform Wa detected by the injection-cylinder pressure sensor 20 to obtain the injection waveform Wb. The injection waveform Wb is shown in FIG. 2C.

Moreover, in a case that a multiple injection is performed, a pressure pulsation Wc due to a prior injection, which is shown in FIG. 2C, overlaps with the fuel pressure waveform Wa. Especially, in a case that an interval between injections is short, the fuel pressure waveform Wa is significantly influenced by the pressure pulsation Wc. Thus, it is preferable that the pressure pulsation Wc and the non-injection pressure waveform Wu (Wud) are subtracted from the fuel pressure waveform Wa to compute the injection waveform Wb.

With respect to #3 fuel injector 10 and #2 fuel injector 10 which respectively have no fuel pressure sensor, a processing of fuel injection control will be described hereinafter. The fuel injection-rate parameters "td", "te", Rα, Rβ, Rmax of #3, #2 fuel injectors 10 are considered the same as those of #1, #4 fuel injectors. The fuel-injection-command signals are established based on these parameters.

If a foreign matter adheres between a sliding surface 11f of the body 11 and the valve body 12, it is likely that the valve body 12 is stuck at its opening position so that the fuel is continuously injected through the fuel injector 10 even though the command signal is generated to stop the fuel injection. Such a malfunction is diagnosed as follows.

Figure 4:
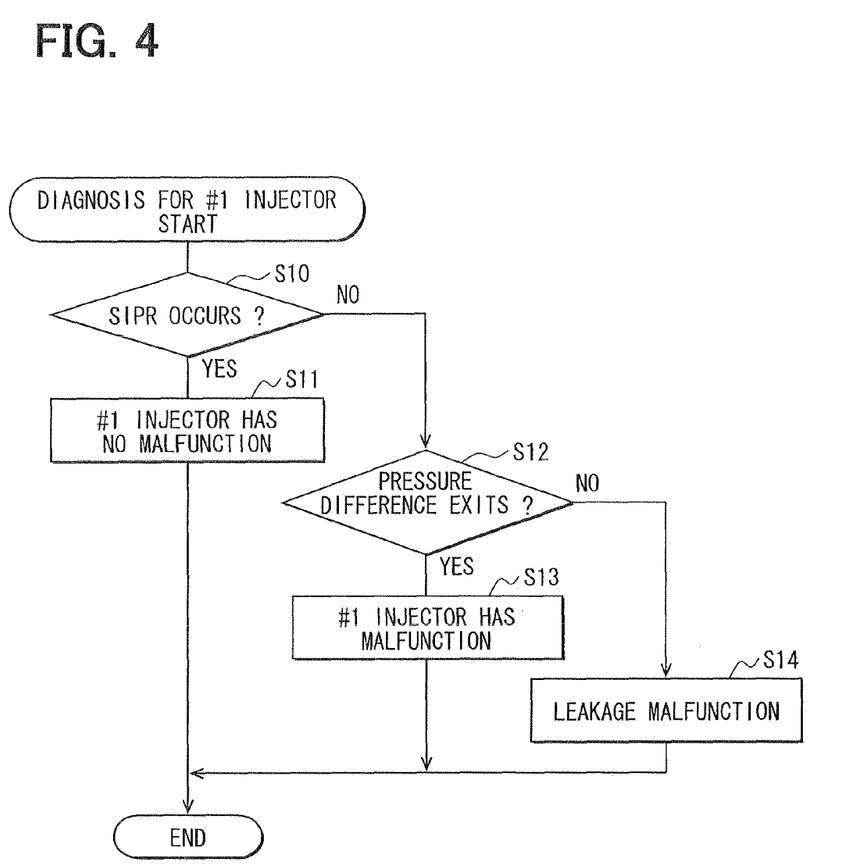
FIG. 4 is a flowchart showing a diagnostic processing in which a diagnosis is executed with respect to #1 fuel injector in which a fuel pressure sensor is provided.
Figure 7:
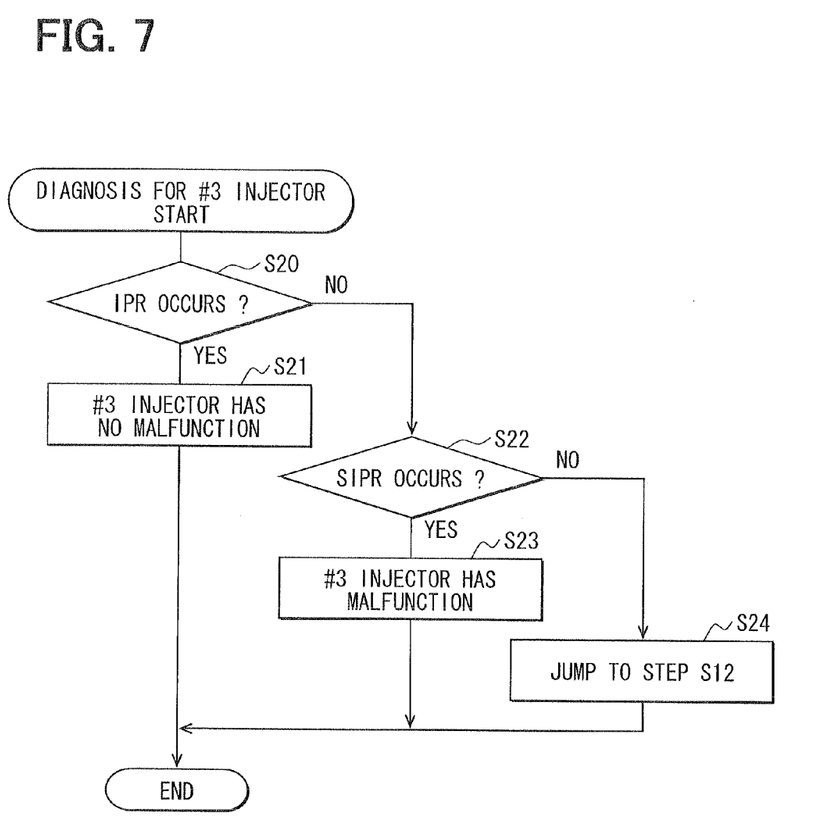
FIG. 7 is a flowchart showing a diagnostic processing in which a diagnosis is executed with respect to #3 fuel injector in which no fuel pressure sensor is provided.

FIG. 4 is a flowchart showing a diagnostic processing in which a diagnosis is executed with respect to #1 fuel injector 10 and #4 fuel injector 10 which have the fuel pressure sensor 20. FIG. 7 is a flowchart showing a diagnostic processing in which a diagnosis is executed with respect to #3 fuel injector 10 and #2 fuel injector 10 which do not have the fuel pressure sensor 20.

Figure 5:
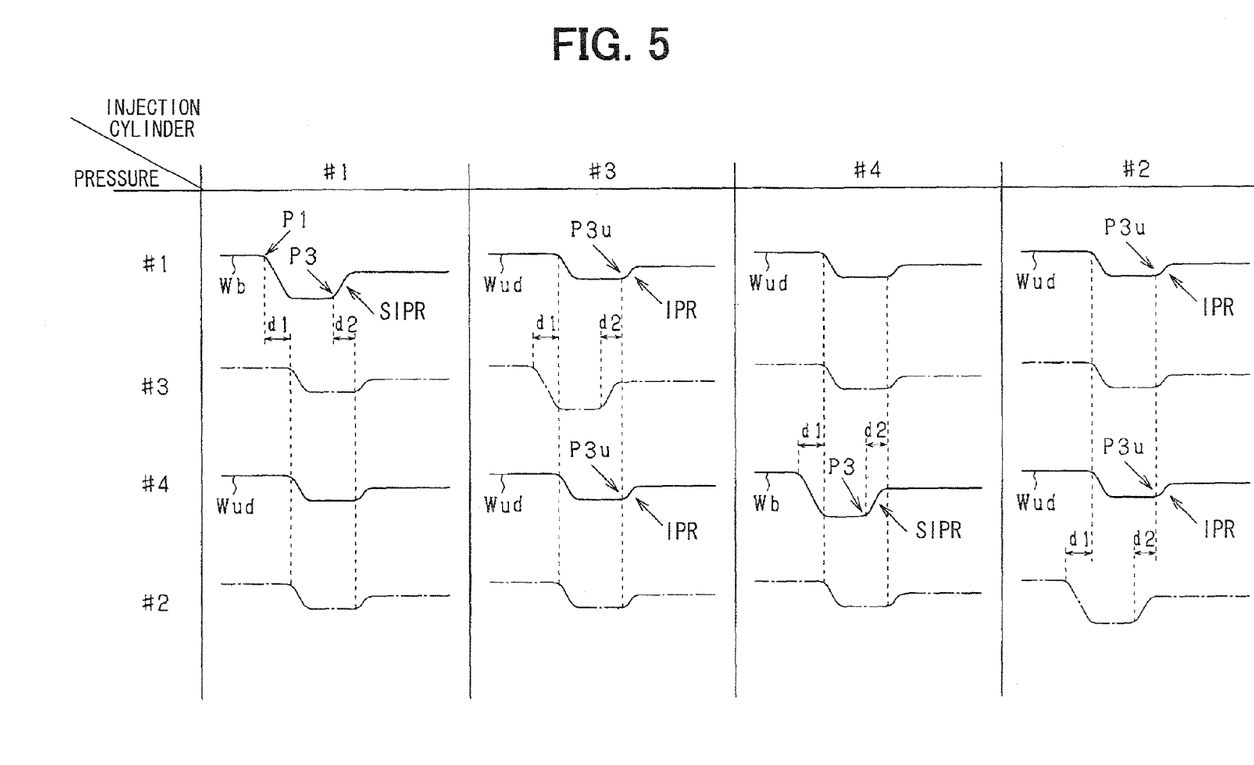

FIG. 5 is a chart showing a fuel pressure variation in the high-pressure passage 11a in a case that no malfunction occurs in all fuel injectors 10, the common-rail 42, the high-pressure pipe 42b and the like. In FIG. 5, the pressure waveform in the injection cylinder corresponds to an injection waveform Wb shown in FIG. 3C, and the pressure waveform in the non-injection cylinder corresponds to a non-injection waveform Wud in FIG. 3B. It should be noted that since #3 fuel injector 10 and #2 fuel injector 10 have no fuel pressure sensor 20, no pressure waveform can be detected with respect to these fuel injectors 10.

As shown in FIG. 5, in a case that no malfunction occurs, when a propagation time delay "d1" has elapsed after the injection pressure waveform Wb starts to descend at a time point P1, the non-injection pressure waveform Wud starts to descend. Further, when a propagation time delay "d2" has elapsed after the injection pressure waveform Wb starts to ascend at a time point P3, the non-injection pressure waveform Wud starts to ascend at a time point P3u.

A diagnostic processing for #1 fuel injector 10 having the fuel pressure sensor 20 will be described hereinafter. It should be noted that the following diagnostic processing is also performed with respect to #4 fuel injector 10 mounted to #4 cylinder.

In step S10 (self-injection-pressure-return determining portion), the computer determines whether a self-injection-pressure-return (SIPR) occurs on the injection pressure waveform Wb detected by the #1 fuel pressure sensor 20 (first pressure sensor). The SIPR represents a fuel-pressure-increase over a specified quantity from the point P3, which is generated when #1 fuel injector 10 (first fuel injector) terminates the fuel injection.

For example, if an inflection point P3 does not appear on the pressure waveform Wb in a specified time after the time point "t2", the computer determines that no SIPR occurs. Also, even if the inflection point P3 appears, if the fuel pressure does not increase over a specified quantity, the computer determines that no SIPR occurs. A determination pressure is defined based on the reference pressure Pbase. When the fuel pressure increases up to the determination pressure, the computer determines that the SIPR occurs.

Figure 6:
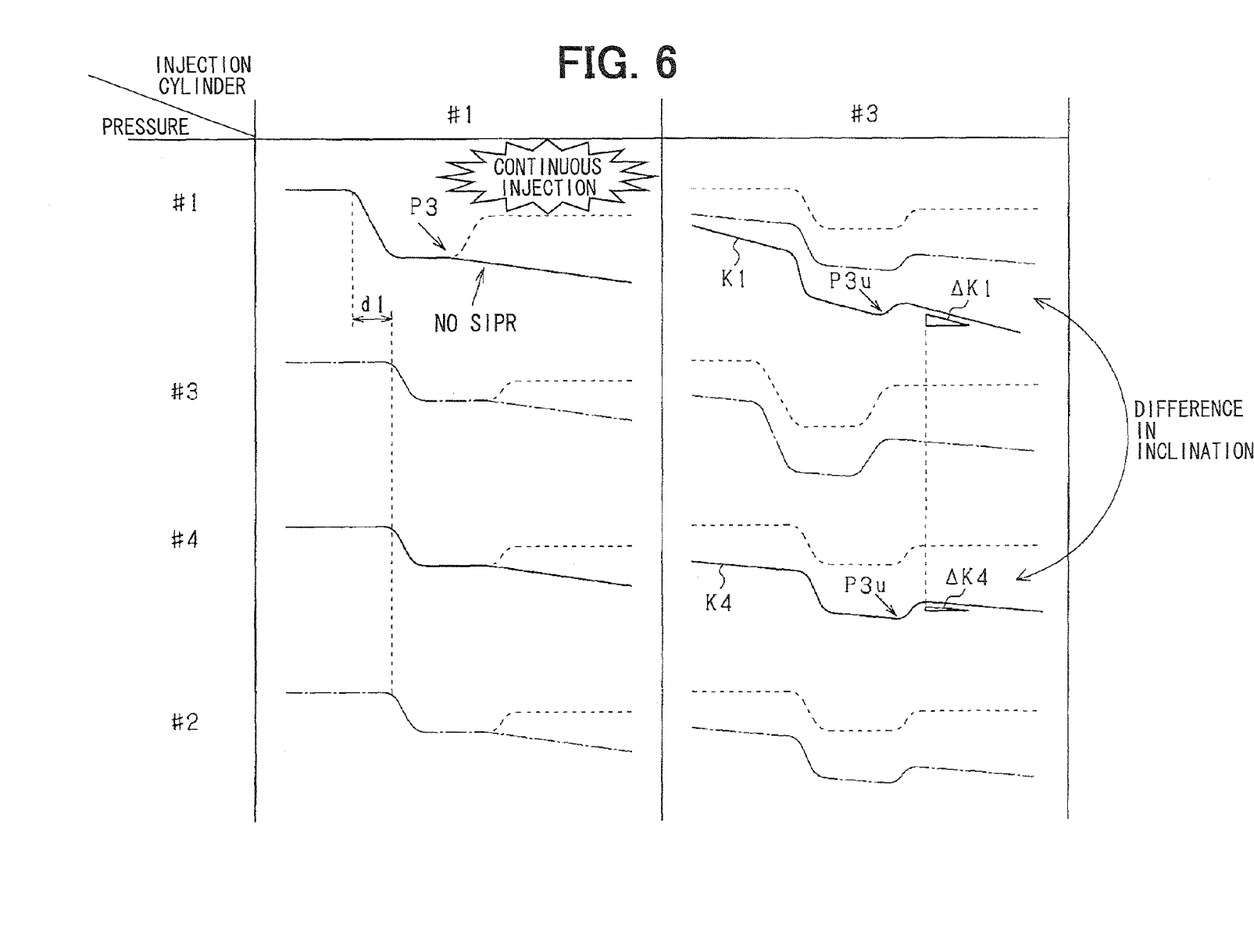
FIG. 6 is a chart showing fuel pressure waveforms in a case that #1 fuel injector has a malfunction of continuous injection.

In FIG. 6, solid lines and alternate long and short dash lines represent fuel pressure waveforms in a case that the fuel injector 10 has a malfunction. As shown in left column of FIG. 6, after a fuel-injection-end command signal is transmitted to #1 fuel injector 10, the injection pressure waveform Wb does not ascend unlike a dashed line. That is, no SIPR occurs and the fuel pressure gradually decreases. Along with this fuel pressure decrease, the non-injection pressure waveform Wud detected by #4 fuel pressure sensor 20 also gradually descends after the fuel-injection-end command signal is transmitted to #1 fuel injector 10.

Also, if a fuel leakage malfunction occurs in the common-rail 42 and the like, the fuel pressure waveform has no SIPR as shown in the left column of FIG. 6.

When the answer is YES in step S10, the procedure proceeds to step S11 in which the computer determines that #1 fuel injector 10, the common-rail 42 and the like have no malfunction.

When the answer is NO in step S10, the procedure proceeds to steps S12 to S14 in which the computer determines whether the common-rail 42 has a leakage malfunction or #1 fuel injector 10 has a malfunction of continuous injection.

In step S12 (pressure-behavior obtaining portion, behavior determining portion), based on the output signals of #1 fuel pressure sensor 20 and #4 fuel pressure sensor 20, the computer obtains non-injection pressure waveforms Wud indicated by a solid line K1 and a solid line K4 in a right column of FIG. 6 in a period where #3 fuel injector 10 and #2 fuel injector 10 (second fuel injectors) having no fuel pressure sensor 20 inject the fuel. Then, the computer determines whether there is a difference between the obtained non-injection pressure waveforms.

For example, in a specified time point after the time point "t1" at which a fuel-injection-start signal is transmitted to #3 fuel injector 10, an inclination ΔK1 of the non-injection pressure waveform Wud indicated by the solid line K1 is compared with an inclination ΔK4 of the non-injection pressure waveform Wud indicated by the solid line K4. If the difference between the inclinations ΔK1 and ΔK4 is greater than a specified value, the computer determines that there is a difference between the obtained non-injection pressure waveforms. It is preferable that the above specified time point is after a time point P3u at which the pressure increase is terminated.

Alternatively, in a specified period after the time point "t1", a pressure drop of the non-injection pressure waveform indicated by the solid line K1 is compared with a pressure drop of the non-injection pressure waveform indicated by the solid line K4. If a difference therebetween is greater than a specified value, the computer determines that there is a difference between the obtained non-injection pressure waveforms. It is preferable that the above specified period is a period after the time point P3u.

In the right column of FIG. 6, the solid lines show a case where the inclination ΔK1 is greater than the inclination ΔK4 by the specified value and the computer determines that there is a difference between the obtained non-injection pressure waveforms. Alternate long and short dash lines show a case where the inclination ΔK1 is equal to the inclination ΔK4 and there is no difference between the obtained non-injection pressure waveforms.

If the common-rail 42 has a leakage malfunction, the fuel pressure waveforms indicated by the solid lines K1 and K4 should be equal to each other. Meanwhile, if #1 fuel injector 10 has a malfunction of continuous injection, the non-injection waveform indicated by the solid line K1 should be different from the non-injection waveform indicated by the solid line K4. A descending speed of the non-injection waveform indicated by the solid line K1 is greater than that of the non-injection waveform indicated by the solid line K4.

In view of the above, when the computer determines that there is a difference between the obtained non-injection pressure waveforms in step S12, the procedure proceeds to step S13 in which the computer determines that #1 fuel injector 10 has a malfunction of continuous injection. That is, it is identified that no SIPR is caused due to a malfunction in #1 fuel injector 10.

Meanwhile, if the answer is NO in step S12, the procedure proceeds to step S14 in which the computer determines that #1 fuel injector 10 has no malfunction and there is a leakage malfunction in the common-rail 42 and the like. That is, it is identified that no SIPR is caused due to a leakage malfunction in the common-rail 42 and the like.

Referring to FIG. 7, a diagnostic processing for #3 fuel injector 10 having no fuel pressure sensor will be described hereinafter. It should be noted that the following diagnostic processing is also performed with respect to #2 fuel injector 10 mounted to #2 cylinder.

In step S20 (pressure-return determining portion), when #3 fuel injector 10 (second fuel injector) terminates a fuel injection, the computer determines whether an injection-pressure-return (IPR) occurs on the injection pressure waveform Wb detected by #1 fuel pressure sensor 20 (first pressure sensor) or #4 fuel pressure sensor (third pressure sensor). The IPR represents a fuel-pressure-increase over a specified value from the point P3u.

For example, if an inflection point P3u (refer to FIGS. 5 and 8) does not appear on the pressure waveform Wb in a specified time after the time point "t2", the computer determines that no IPR occurs. Also, even if the inflection point P3u appears, if the fuel pressure does not increase over a specified quantity, the computer determines that no IPR occurs. A determination pressure is defined based on the reference pressure Pbase. When the fuel pressure increases up to the determination pressure, the computer determines that the IPR occurs.

Figure 8:
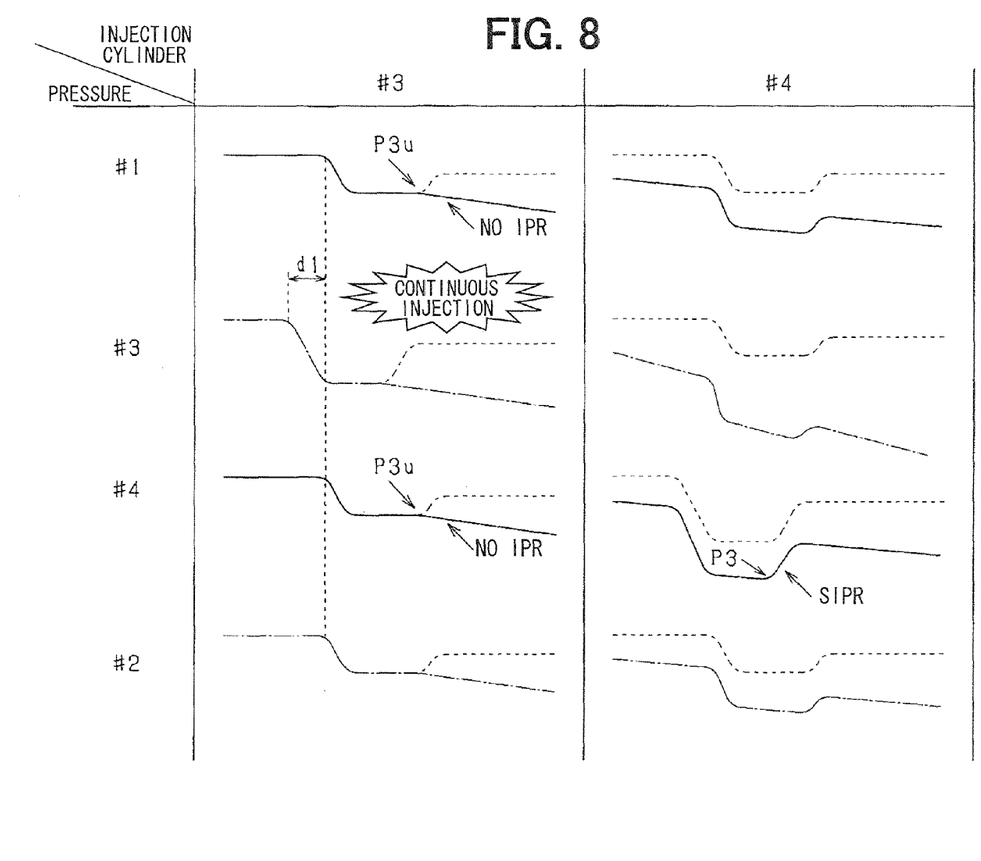
FIG. 8 is a chart showing fuel pressure waveforms in a case that #3 fuel injector has a malfunction of continuous injection.

In FIG. 8, solid lines and alternate long and short dash lines represent fuel pressure waveforms in a case that #3 fuel injector 10 has a malfunction of continuous injection. As shown in left column of FIG. 8, after a fuel-injection-end command signal is transmitted to #3 fuel injector 10, the fuel pressure in the high-pressure passage 11a (second fuel passage) of #3 fuel injector 10 does not ascend unlike a dashed line. The fuel pressure gradually decreases. Along with this fuel pressure decrease, the non-injection pressure waveforms Wud detected by #1 fuel pressure sensor 20 and #4 fuel pressure sensor 20 also gradually descend after the fuel-injection-end command signal is transmitted to #1 fuel injector 10.

Also, if #1 or #4 fuel injector 10 has a malfunction of continuous injection or a fuel leakage malfunction occurs in the common-rail 42 and the like, the fuel pressure waveform has no IPR as shown in the left column of FIG. 8.

When the answer is YES in step S20, the procedure proceeds to step S21 in which the computer determines that #3 fuel injector 10, the common-rail 42 and the like have no malfunction.

When the answer is NO in step S20, the procedure proceeds to steps S22 to S24 in which the computer determines whether #3 fuel injector 10 has a malfunction of continuous injection.

In step S22 (self-injection-pressure-return determining portion), the computer determines whether a self-injection-pressure-return (SIPR) occurs on the injection pressure waveform Wb detected by the #1 fuel pressure sensor 20 (first pressure sensor). The SIPR represents a fuel-pressure-increase over a specified value from the point P3, which is generated when #1 fuel injector 10 (first fuel injector) terminates a fuel injection. The determination process in step S22 is the same as the determination process in step S10.

When the computer determines that the SIPR occurs in step S22, the procedure proceeds to step S23 in which the computer determines that #3 fuel injector 10 has a malfunction of continuous injection. That is, it is identified that no SIPR is caused due to a malfunction in #3 fuel injector 10.

Meanwhile, when the answer is NO in step S22, the procedure proceeds to step S24 in which the computer determines that #3 fuel injector 10 has no malfunction. However, even if the determination in steps S20 and S22 is conducted, it is impossible to identify whether a malfunction in the common-rail or a malfunction in #1 fuel injector 10 causes no SIPR.

When the answer is NO in step S22, the procedure proceeds to step S24 in which the determination in step S10 of FIG. 4 is conducted. That is, when the answer is NO in step S20, the answer is NO in step S10 and the answer is YES in step S12, the computer determines that #1 fuel injector 10 has a malfunction of continuous injection. Meanwhile, when the answer is NO in step S20, the answer is NO in step S10 and the answer is NO in step S12, it is identified that no IPR is caused due to a leakage malfunction in the common-rail 42 and the like.

As described above, according to the present embodiment, based on the detection signals of #1 fuel pressure sensor 20 and #4 fuel pressure sensor 20, the computer can determines whether #3 fuel injector 10 and/or #2 fuel injector 10, which have no fuel pressure sensor, has a malfunction of continuous injection. Therefore, while the number of fuel pressure sensor 20 can be reduced, a diagnosis can be conducted with respect to #3 fuel injector 10 and #2 fuel injector 10.

Moreover, without providing the fuel pressure sensor 20 to every (#1 to #4) fuel injector 10, it can be identified whether a malfunction of continuous injection occurs in the fuel injectors 10 having the fuel pressure sensor 20 or a leakage malfunction occurs in the common-rail 42 and the like.

Other Embodiment

The present invention is not limited to the embodiments described above, but may be performed, for example, in the following manner. Further, the characteristic configuration of each embodiment can be combined.

In step S12, the computer can determine whether there is a difference between the obtained non-injection pressure waveforms of before the time point P3u.

In the above embodiment, the diagnosis is conducted based on the injection waveform Wb which is obtained by subtracting the non-injection waveform Wu from an injection waveform Wa. However, the diagnosis can be conducted based on the injection waveform Wa.

The present disclosure can be applied to a six-cylinder engine and an eight-cylinder engine. In the diagnosis shown in FIG. 4, it is necessary to provide at least two fuel pressure sensors 20 to the fuel injectors 10 respectively. In the diagnosis shown in FIG. 7, it is necessary to provide at least one fuel pressure sensors 20 to the fuel injectors 10.

The fuel pressure sensor 20 can be arranged at any place in a fuel supply passage between an outlet 42a of the common-rail 42 and the injection port 11b. For example, the fuel pressure sensor 20 can be arranged in a high-pressure pipe 42b connecting the common-rail 42 and the fuel injector 10.

What is claimed is:

1. A diagnostic apparatus for a fuel injector mounted to a fuel injection system which includes:
   a first fuel injector mounted to a first cylinder of an internal combustion engine;
   a second fuel injector mounted to a second cylinder of the engine;
   an accumulator accumulating a fuel for distributing a high-pressure fuel into the first fuel injector and the second fuel injector;
   a first fuel passage extending from an outlet of the accumulator to an injection port of the first fuel injector;
   a first fuel pressure sensor disposed in the first fuel pressure passage for detecting a fuel pressure in the first fuel passage;
   a second fuel passage extending from an outlet of the accumulator to an injection port of the second fuel injector,
   the diagnostic apparatus comprising:
   a pressure-return determining portion for determining, based on a detection value of the first fuel pressure sensor, whether a specified pressure increase occurs in the first fuel passage when the second fuel injector terminates a fuel injection;
   a diagnosis portion for determining that the second fuel injector has no malfunction of continuous injection when the pressure-return determining portion determines that the specified pressure increase occurs in the first fuel passage;
   a self-injection-pressure-return determining portion for determining, based on a detection value of the first fuel pressure sensor, whether a self-injection-pressure-return occurs in the first fuel passage when the first fuel injector terminates a fuel injection; and
   a diagnosis portion for determining that the second fuel injector has a malfunction of continuous injection when the pressure-return determining portion determines that no pressure increase occurs in the first fuel passage and the self-injection-pressure-return determining portion determines that the self-injection-pressure-return occurs in the first fuel passage; wherein:
   the fuel injection system further includes:
   a third fuel injector mounted to a third cylinder of the internal combustion engine for injecting the fuel supplied from the accumulator;
   a third fuel passage extending from an outlet of the accumulator to an injection port of the third fuel injector; and
   a second fuel pressure sensor disposed in the third fuel pressure passage for detecting a fuel pressure in the third fuel passage,
   the diagnostic apparatus further comprises:
   a pressure-behavior obtaining portion for obtaining, based on detection values of the first fuel pressure sensor and the second fuel pressure sensor, a fuel pressure behavior in the first fuel passage and the third fuel passage when the second fuel injector terminates a fuel injection; and
   a behavior determining portion for determining whether there is a specified difference between the fuel pressure behavior in the first fuel passage and the fuel pressure behavior in the third fuel passage, wherein
   the diagnosis portion determines that the first fuel injector has a malfunction of continuous injection when the pressure-return determining portion determines that no pressure increase occurs in the first fuel passage, the self-injection-pressure-return determining portion determines that no self-injection-pressure-return occurs in the first fuel passage, and the behavior determining portion determines that there is said specified difference.

2. A diagnostic apparatus for a fuel injector mounted to a fuel injection system which includes:
   a first fuel injector mounted to a first cylinder of an internal combustion engine;
   a second fuel injector mounted to a second cylinder of the engine;
   an accumulator accumulating a fuel for distributing a high-pressure fuel into the first fuel injector and the second fuel injector;
   a first fuel passage extending from an outlet of the accumulator to an injection port of the first fuel injector;
   a first fuel pressure sensor disposed in the first fuel pressure passage for detecting a fuel pressure in the first fuel passage;
   a second fuel passage extending from an outlet of the accumulator to an injection port of the second fuel injector,
   the diagnostic apparatus comprising:
   a pressure-return determining portion for determining, based on a detection value of the first fuel pressure sensor, whether a specified pressure increase occurs in the first fuel passage when the second fuel injector terminates a fuel injection;
   a diagnosis portion for determining that the second fuel injector has no malfunction of continuous injection when the pressure-return determining portion determines that the specified pressure increase occurs in the first fuel passage;
   a self-injection-pressure-return determining portion for determining, based on a detection value of the first fuel pressure sensor, whether a self-injection-pressure-return occurs in the first fuel passage when the first fuel injector terminates a fuel injection; and
   a diagnosis portion for determining that the second fuel injector has a malfunction of continuous injection when the pressure-return determining portion determines that no pressure increase occurs in the first fuel passage and the self-injection-pressure-return determining portion determines that the self-injection-pressure-return occurs in the first fuel passage: wherein:

the fuel injection system further includes:

a third fuel injector mounted to a third cylinder of the internal combustion engine for injecting the fuel supplied from the accumulator;

a third fuel passage extending from an outlet of the accumulator to an injection port of the third fuel injector; and a second fuel pressure sensor disposed in the third fuel pressure passage for detecting a fuel pressure in the third fuel passage, the diagnostic apparatus further comprises:

a pressure-behavior obtaining portion for obtaining a fuel pressure behavior in the first fuel passage and the third fuel passage based on detection values of the first fuel pressure sensor and the second fuel pressure sensor, when the second fuel injector terminates a fuel injection; and a behavior determining portion for determining whether there is a specified difference between the fuel pressure behavior in the first fuel passage and the fuel pressure behavior in the third fuel passage, wherein the diagnosis portion determines that a leakage malfunction occurs, when the pressure-return determining portion determines that no pressure increase occurs in the first fuel passage, the self-injection-pressure-return determining portion determines that no self-injection-pressure-return occurs in the first fuel passage, and the behavior determining portion determines that there is no specified difference.

3. A diagnostic apparatus for a fuel injector according to claim 1, wherein the diagnosis portion determines that a leakage malfunction occurs, when the pressure-return determining portion determines that no pressure increase occurs in the first fuel passage, the self-injection-pressure-return determining portion determines that no self-injection-pressure-return occurs in the first fuel passage, and the behavior determining portion determines that there is no specified difference.

4. A diagnostic apparatus for a fuel injector according to claim 1, wherein the second fuel injector is provided with no fuel pressure sensor.

5. A diagnostic apparatus for a fuel injector according to claim 2, wherein the second fuel injector is provided with no fuel pressure sensor.

* * * * *